United States Patent
Lee et al.

(10) Patent No.: US 9,100,121 B2
(45) Date of Patent: Aug. 4, 2015

(54) LINK SETUP METHOD FOR WAVELENGTH DIVISION MULTIPLEXING WAVELENGTH PASSIVE OPTICAL NETWORK(WDM PON) SYSTEM

(75) Inventors: Eun-Gu Lee, Daejeon-si (KR); Eui-Suk Jung, Daejeon-si (KR); Sil-Gu Mun, Daejeon-si (KR); Jie-Hyun Lee, Daejeon-si (KR); Han-Hyub Lee, Daejeon-si (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 143 days.

(21) Appl. No.: 13/538,662

(22) Filed: Jun. 29, 2012

(65) Prior Publication Data

US 2013/0004174 A1    Jan. 3, 2013

(30) Foreign Application Priority Data

| Jun. 30, 2011 | (KR) | 10-2011-0064259 |
| Apr. 19, 2012 | (KR) | 10-2012-0041142 |
| Apr. 20, 2012 | (KR) | 10-2012-0041781 |
| Apr. 20, 2012 | (KR) | 10-2012-0041782 |
| Apr. 20, 2012 | (KR) | 10-2012-0041792 |
| Jun. 29, 2012 | (KR) | 10-2012-0071048 |

(51) Int. Cl.
  *H04J 14/02* (2006.01)
  *H04B 10/272* (2013.01)

(52) U.S. Cl.
  CPC ............ *H04B 10/272* (2013.01); *H04J 14/025* (2013.01); *H04J 14/0246* (2013.01); *H04J 14/0257* (2013.01); *H04J 14/0267* (2013.01); *H04J 14/0252* (2013.01)

(58) Field of Classification Search
  CPC .. H04J 14/0246; H04J 14/025; H04J 14/0257
  USPC ........................................................ 398/69, 72
  See application file for complete search history.

(56) References Cited

U.S. PATENT DOCUMENTS

| 8,320,760 B1 * | 11/2012 | Lam et al. ........................ 398/66 |
| 8,649,681 B2 * | 2/2014 | Ohlen ............................. 398/72 |

(Continued)

FOREIGN PATENT DOCUMENTS

| KR | 10-0675839 | 1/2007 |
| KR | 10-0903121 | 6/2009 |

(Continued)

OTHER PUBLICATIONS

Lee, Eun-Gu et al., "Self-Wavelength-Initialization Method Using a Dedicated Light Path of WDM-PON," The 10th International Conference on Optical Internet, 2 pages (2012).

(Continued)

*Primary Examiner* — Nathan Curs
(74) *Attorney, Agent, or Firm* — Nelson Mullins Riley & Scarborough LLP; Anthony A. Laurentano, Esq.; Lewis Lee, Esq.

(57) ABSTRACT

A link setup method for a wavelength-division-multiplexing passive optical network (WDM PON) system. The system includes a service providing device, a local node, and a plurality of subscriber devices. The link setup method includes assigning an initial wavelength for communication between the service providing device and a new subscriber device to be installed in the local node. The assigning of the initial wavelength may be performed as a part of process for activating the subscriber device, and this procedure may be performed between a physical layer of the service providing device and a physical layer of the new subscriber device.

13 Claims, 18 Drawing Sheets

(56) References Cited

U.S. PATENT DOCUMENTS

2007/0230957 A1* 10/2007 Ozaki ............................ 398/71
2008/0166127 A1* 7/2008 Kazawa et al. ................ 398/79
2010/0316386 A1* 12/2010 Luk et al. ....................... 398/93

FOREIGN PATENT DOCUMENTS

| KR | 10-0910940 | 8/2009 |
|----|------------|--------|
| KR | 10-0914559 | 9/2009 |
| KR | 1020090110565 | 10/2009 |

OTHER PUBLICATIONS

Moon, Jung-Hyung et al., "An Automatic Wavelength Control Method of a Tunable Laser for a WDM-PON," IEEE Photonics Technology Letters, vol. 21(5):325-327 (2009).

\* cited by examiner

LINK SETUP METHOD FOR WAVELENGTH DIVISION MULTIPLEXING WAVELENGTH PASSIVE OPTICAL NETWORK(WDM PON) SYSTEM

CROSS-REFERENCE TO RELATED APPLICATION(S)

This application claims the benefit under 35 U.S.C. §119(a) of Korean Patent Application Nos. 10-2011-0064259, filed on Jun. 30, 2011, 10-2012-0041142, filed on Apr. 19, 2012, 10-2012-0041781, 10-2012-0041782 and 10-2012-0041792, filed on Apr. 20, 2012, and 10-2012-0071048, filed on Jun. 29, 2012, in the Korean Intellectual Property Office, the entire disclosures of which are incorporated herein by references for all purposes.

BACKGROUND

1. Field

The following description relates to a Passive Optical Network (PON), and more particularly, to a link setup method in a Wavelength Division Multiplexing Passive Optical Network (WDM PON) system.

2. Description of the Related Art

In response to the development of optical communication technology and a sharp increase in the demand of Internet services, basic research on an optical subscriber network has been conducted since the early 2000s, and currently the introduction of a broadband subscriber network, such as Fiber To The Home (FTTH) and Fiber To The Office (FTTO), which connects a remote station or a central office (CO) with a subscriber through an optical fiber, is actively in progress. Recently, research on technology for the next-generation, high-speed, high-capacity optical subscriber network has been actively carried out in response to the phenomenal traffic growth due to the proliferation of mobile Internet protocol (IP) terminals, such as a smart phone and a tablet computer, the commercialization of IPTV services, and the spread of multimedia broadcasting/streaming services over the Internet.

The methods used for efficiently providing a service to as many subscribers as possible using a limited amount of network resources are Time Division Multiplexing (TDM) and Wavelength Division Multiplexing (WDM) schemes, and, in recent years, many attempts have been made to integrate various schemes for mobile communications, such as Orthogonal Frequency Division Multiplexing (OFDM), to optical subscriber network technology. A WDM scheme which assigns a unique wavelength to each subscriber for communications can provide the individual subscribers with high-speed communication services, as well as easily increase communication capacity and a number of subscribers and also have excellent communication security. Thus, more attention is paid to a hybrid WDM scheme for the next-generation high-speed, high-capacity optical subscriber network technology.

In a Wavelength Division Multiplexing Passive Optical Network (WDM PON), data transmission/reception between each subscriber and a central office (CO) is performed using a unique wavelength assigned to the each subscriber. Basically, a WDM PON system includes a service providing device (hereinafter, referred to as an "optical line terminal (OLT)") at a CO side, a user terminal device or a plurality of subscriber devices (hereinafter, referred to as optical network units (ONUs)) around the user terminal device, and a local node or optical distribution network (ODN) in which one or more optical multiplexers/demultiplexers (Mux/Demux) or optical intensity splitters are placed. A network configuration may vary depending on a type of light source, for example, a spectrum-sliced light source, a wavelength-locked light source, or a wavelength-independent light source. Other types of hybrid WDM scheme may have different network configurations.

Wavelength assignment to ONUs is prerequisite to link setup for communications between the OLT and each ONU in a WDM PON system. The procedures for link setup between OLT and ONUs, including the wavelength assignment, may differ according to the network configuration which may vary depending on the type of a light source and/or whether the system is a hybrid type or not. Since elements or devices for use in establishing the WDM-PON system are not compatible with each other, the change of the wavelength assignment process according to the network configuration may lead to an increase of price. Furthermore, the link setup process that differs depending on the network configuration may hinder the development of hybrid WDM schemes.

SUMMARY

The following description relates to a link setup method for a Wavelength Division Multiplexing Passive Optical Network (WDM PON) system, which can be seamlessly applied regardless of a network configuration of the PON system and accomplish compatibility with existing products.

The following description also relates to a link setup method for a Multiple Wavelength Passive Optical Network (MW PON) system using the combination of Time Division Multiplexing (TDM) and Wavelength Division Multiplexing (WDM).

In one general aspect, there is provided a link setup method for a Wavelength Division Multiplexing Passive Optical Network (WDM PON) system including a service providing device, a local node and a plurality of subscriber devices, the link setup method including: assigning an initial wavelength for communication between the service providing device and a new subscriber device to be installed in the local node, wherein the assigning of the initial wavelength is performed as a part of process for activating the subscriber device.

The assigning of the initial wavelength may be performed through signal transmission/reception between a physical layer of the service providing device and a physical layer of the new subscriber device.

The local node may include one or more optical multiplexers/demultiplexers and the assigning of the initial wavelength is performed during physical installation of the new subscriber device. The assigning of the initial wavelength may include transmitting, at the new subscriber device, an optical signal of a predetermined wavelength to the service providing device, and receiving, at the new subscriber device, a response to the optical signal from the service providing device. The new subscriber device may change a wavelength of the optical to signal at predetermined time intervals and transmit the optical signal until receiving the response, and the assigning of the initial wavelength may be completed when the new subscriber device receives the response. The time interval may be $2\tau_P + \tau_{remote\ station} + \tau_G$, in which $2\tau_P$ indicates a propagation delay time of the transmitted optical signal $\tau_{remote\ station}$ denotes a processing time at the service providing device and $\tau_G$ indicates a guard time. The time interval may be shorter than a time taken for the response to the previously transmitted optical signal to reach the subscriber device.

The local node may include one or more splitters. The new subscriber device may include a wavelength-tunable filter in front of its optical transceiver. The wavelength-tunable filter may be disposed on a common path of a transmitting terminal and a receiving terminal of the optical transceiver. If the optical transceiver uses light having upstream and downstream wavelengths being the same as each other or if the filter has free-spectral-range (FSR) properties, the optical transceiver may be disposed on a path of a receiving terminal of the WDM PON system.

The link setup method may further include checking, at a media access control (MAC) layer, whether a wavelength has been assigned to the new subscriber device.

The WDM PON system may include one or more service providing devices including the service providing device and the one or more service providing devices may provide services to the plurality of subscriber devices using a combination of a time division multiplexing scheme and a wavelength division multiplexing scheme.

Other features and aspects may be apparent from the following detailed description, the drawings, and the claims.

BRIEF DESCRIPTION OF THE DRAWINGS

FIG. 10B is a diagram for explaining wavelength initialization process in the MW PON system including the splitter when at least one OLT is power-on.

Figure 1A:
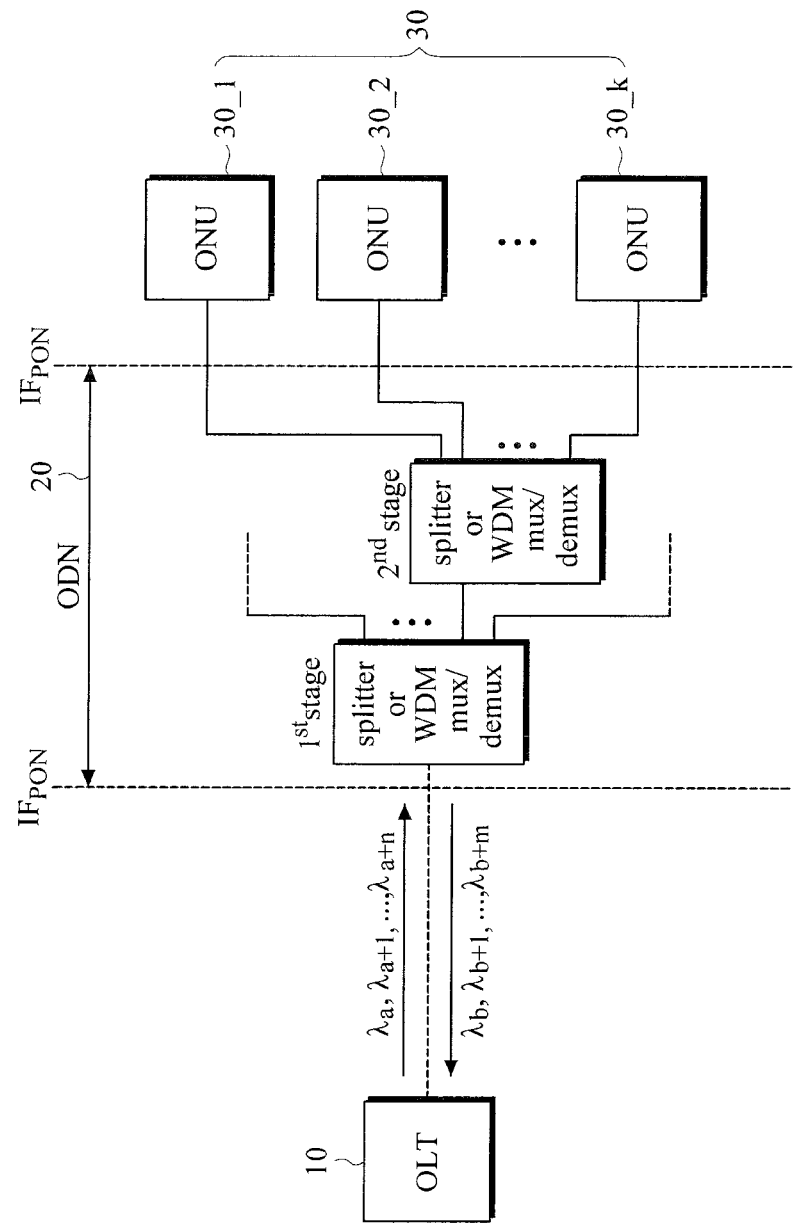
FIG. 1A is a block diagram illustrating a Wavelength Division Multiplexing Passive Optical Network (WDM PON) system to which a link setup method can be applied according to an exemplary embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

A link setup method described herein according to exemplary embodiments of the present invention may be applied to a Wavelength Division Multiplexing Wavelength Passive Optical Network (WDM PON) system. The link setup method may be applied to any type of WDM PON system, regardless of a type of optical source. For example, the WDM PON system may use a spectrum-sliced light source, a wavelength-locked light source, or a wavelength-independent light source. The link setup method described herein may be applied not only to the exiting WDM PON systems, but also to other types of passive optical network system such as a Multiple Wavelength PON system (hereinafter, referred to as an "MW PON system"). The MW PON system may be a hybrid system that uses the combination of WDM and TDM.

Figure 1B:
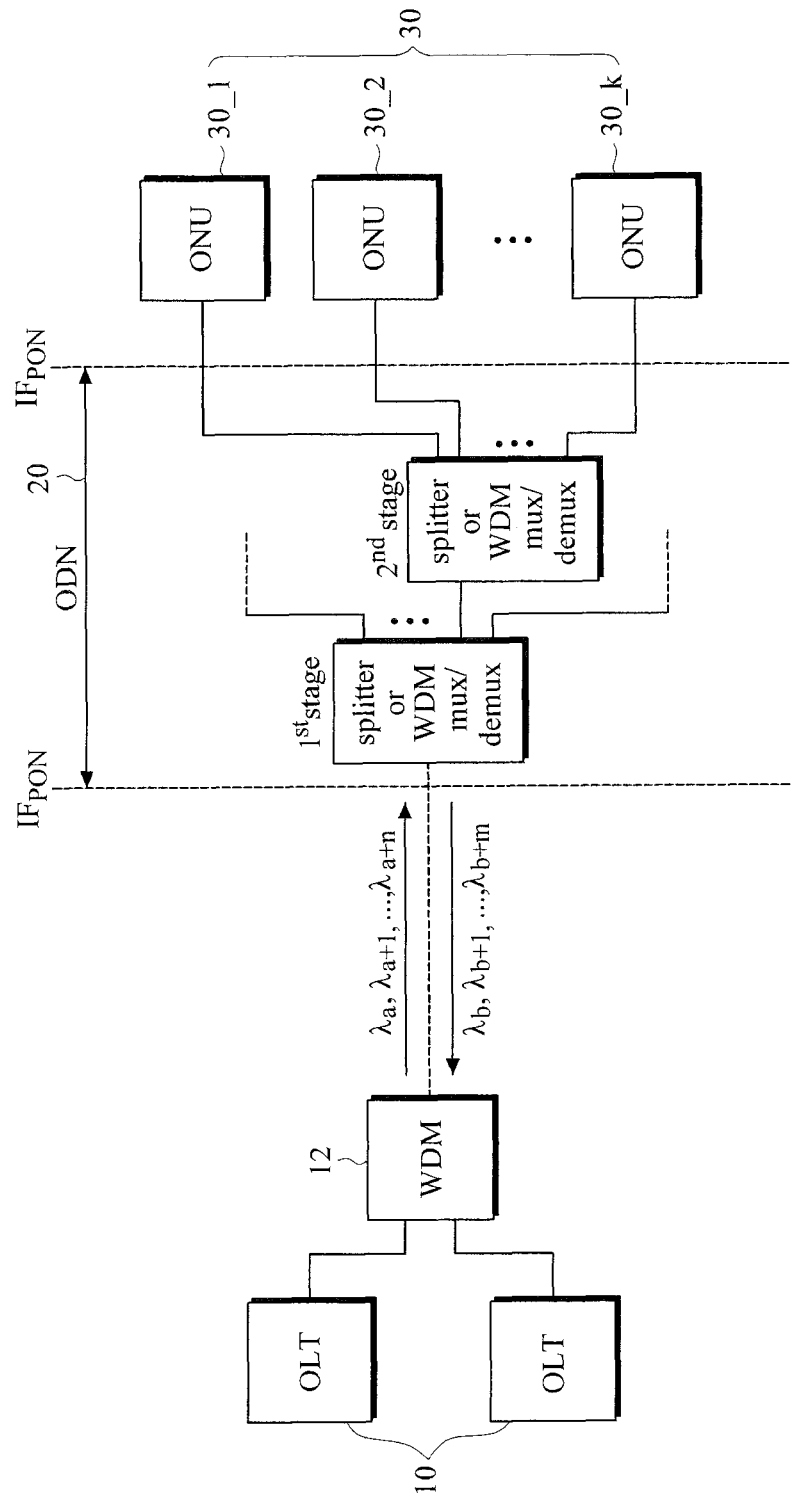
FIG. 1B is a block diagram illustrating a WDM PON system to which a link setup is method can be applied according to another exemplary embodiment of the present invention.

FIG. 1A is a block diagram illustrating a Wavelength Division Multiplexing Passive Optical Network (WDM PON) system to which a link setup method can be applied according to an exemplary embodiment of the present invention. FIG. 1B is a block diagram illustrating a WDM PON system to which a link setup method can be applied according to another exemplary embodiment of the present invention. The WDM PON systems shown in FIGS. 1A and 1B are different from each other in the number of service providing devices such as an Optical Line Ten Anal (OLT). The WDM PON system of FIG. 1A has one OLT and the WDM PON system of FIG. 1B has a plurality of OLTs. The WDM PON system shown in FIG. 1B further includes a WDM unit 12 at a central base-station side that is connected to a plurality of OLTs.

The WDM PON systems shown in FIGS. 1A and 1B may be Multiple Wavelength Passive Network (MW PON) systems. The MW PON system may be a WDM PON system in which a plurality of subscriber devices, that is, Optical Network Units (ONUs), do not share wavelengths with each other, a system in which a plurality of Time Division Multiplexing to Passive Optical Network (TDM PON) systems are stacked in one OLT and a different wavelength is assigned for each of the TDM PON systems, or a TDM PON system which can support traffic load balancing through dynamic tuning of wavelengths. Alternatively, the MW PON system may be a hybrid PON system that is comprised by the combination of all or parts of the aforementioned systems. The MW PON system may be graded based on tenability of an ONU and/or a tuning speed of wavelengths.

Referring to FIGS. 1A and 1B, the MW PON system includes one or more OLTs 10, an Optical Distribution Network (ODN) 20, and a plurality of ONUs 30. The OLT 10 corresponds to a service providing device, the ODN 20 corresponds to a local node, and the ONU 30 corresponds to a subscriber device. One or more OLTs 10 is placed in a central base-station CO side, transmits downlink data $\lambda_a, \lambda_{a+1}, \ldots, \lambda_{a+n}$ to the respective ONUs 30 and receive uplink data $\lambda_b, \lambda_{b+1}, \ldots, \lambda_{b+m}$ from the respective ONUs 30. Although not illustrated, the MW PON system further includes a light source capable of supporting wavelength division multiplexing. For example, the light source may be included in each of the one or more OLTs 10 and/or each of the ONUs 30. Any types of light sources may be used and the types may vary depending on the type of WDM PON system. For example, the light source may be a wavelength tunable light source that can tune wavelengths, whereby problems in generating, installing and managing a light source of each wavelength can be solved. For example, wavelengths can be dynamically assigned to provide load balancing, or when a specific wavelength link is congested, the specific wavelength is immediately changed to enable a seamless communication.

Each of the plurality of ONUs 30 transmits and receives downlink data and uplink data to and from the OLT 10 using an assigned wavelength. In this case, according to a type of MW PON system, the ONU 30 may transmit data within the allocated transmission time, but the present embodiment is not limited thereto.

The ODN 20 may include one or more splitters or WDM multiplexers/demultiplexers to split and/or demultiplex downstream signals from the OLT 10 into a plurality of portions corresponding to wavelengths and transmit the split/demultiplexed portions to the respective ONUs 30_1, 30_2, . . . , and 30_k, or to combine/multiplex upstream signals from the ONUs 30_1, 30_2, . . . , and 30_k and transmit the combined/multiplexed signal to the OLT 10. Depending on the number of splitters or WDM multiplexers/demultiplexers, the splitting/demultiplexing process and the combining/multiplexing process may consist of multiple stages. Reference character "IFPON" in FIGS. 1A and 1B denotes an interface of a passive optical network which may vary in type.

For data transmission/reception between one or more OLTs 10 and the multiple ONUs 30 in the MW PON system as shown in FIGS. 1A and 1B, a link setup process is required to set up a link between each of the OLTs 10 and each of the ONUs 30_1, 30_2, . . . , and 30_k. The link setup process includes initialization of a wavelength to be used by each of the ONUs 30_1, 30_2, . . . , and 30_k. In other words, from the point of view of the OLT 10, the link setup process includes assignment of wavelengths to the respective ONUs 30_1, 30_2, . . . , and 30_k.

In the MW PON system including the splitter-based ODN 20, a new ONU, for example ONU 30_k, which is to be installed in the system, is activated only when an initial wavelength is assigned thereto. The initial wavelength may include a downstream wavelength and an upstream wavelength. The initial wavelength assignment, that is, the wavelength initialization is prerequisite to activation of the new ONU 30_k. In a case where the new ONU 30_k is installed in the ODN 20, the initial downstream and upstream wavelengths should be automatically and separately assigned between the OLT 10 and the new ONU 30_k. The wavelength assignment process may be performed as a part of the process for activating the new ONU 30_k. For an appropriate communication with the OLT 10, the ONU downstream wavelength and upstream wavelength should be specified as soon as possible, and during the ONU activation process, wavelength tuning may be required. In an MW PON system including an Arrayed Wavelength Gating (AWG)-based ODN 20, only one wavelength is allowed to pass through the ODN 20 from the OLT 10 to the ONU 30 or from the ONU 30 to the OLT. In this case, the wavelength assignment may be performed during physical installation process, which will be described in detail below.

Figure 2:
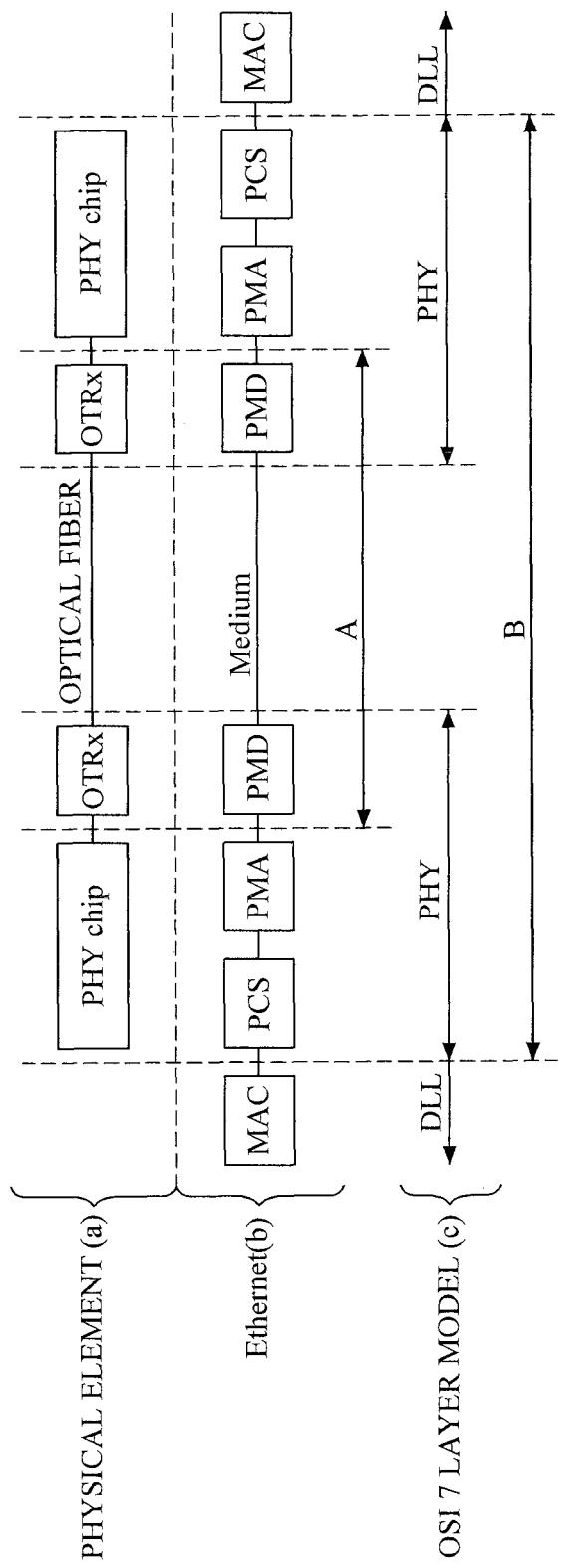
FIG. 2 is a block diagram illustrating a configuration of a physical layer in an Ethernet network.

FIG. 2 is a block diagram illustrating a configuration of a physical layer PHY in an Ethernet network. (a) in FIG. 2 shows positions of physical elements corresponding to each part of the physical layer PHY of optical communication, (b) shows a physical layer on the Ethernet network corresponding to the physical layer (PHY), and (c) shows a physical layer PHY as Layer 1 of the OSI 7 layer model. The blocks shown in FIG. 2 each have functions as follows:

Medium: Signal transmission path

PMD (Physical Medium Dependent): Transmit/receive signals

PMA (Physical Medium Attachment): Perform parallelization of serial signals or serialization of parallel signals PCS (Physical Coding Sub-layer): Perform auto-negotiation and carrier-sensing for link setup.

MAC (Media Access Control): Perform framing, signal processing, media access control, frame check.

PHY (Physical layer): Activate and maintain a physical link between systems and define electrical, mechanical, and functional problems.

DLL (Data-Link layer): Provide reliable data transfer through a physical layer, and be to involved with physical addressing, network topology, line discipline, error notification, sequencing of frames, and flow control.

The wavelength assignment process, that is, the link initialization process is related with a method of initializing a link in a physical layer PHY as shown in 2(c). The physical layer PHY is the bottom layer within OSI 7 layer model which is a network communication model designated by International Standardization Organization (ISO). A physical layer on an Ethernet network that corresponds to the physical layer PHY as shown in FIG. 2(c) may be formed as shown in FIG. 2(b). In addition, FIG. 2(a) shows positions of the physical elements that correspond to each part of the physical layer PHY in optical communication, wherein an optical transceiver OTRx corresponds to PMD and a physical layer PHY chip corresponds to PCS and PMA.

The method for initializing a link or wavelength on the physical layer PHY according to the exemplary embodiment of the present invention may include assignment of wavelengths for each ONU in a WDM PON system during the physical installation process. Thus, the exemplary embodiment of the present invention is different from the conventional link initialization process in a network such as an Ethernet, which is performed on a layer higher than the physical layer. Hence, according to the exemplary embodiment, the link initialization process, that is, the initial wavelength assignment process for ONU activation may be performed without the intervention from MAC. For example, the link initialization process may be performed by the optical transceiver OTRx that is PMD placed in section A shown in FIG. 2. This link initialization process is different from the conventional link initialization in an Ethernet network which requires PCS at section B for auto-negotiation and carrier sensing.

In the WDM PON system employing the exemplary embodiment of the invention, wavelengths for media access arbitration are core resources, regardless of a type of the WDN to PON system, for example, a splitter-based system and an AWG-based system. Thus, in the WDM PON system, it is required that an OLT ensures ONU wavelength assignment within a MAC layer, whereby usual wavelength maintenance can be done smoothly. Information about the availability of wavelength resources and wavelength assignment may be provided for resource management. An available time slot and wavelength may be used for dynamic wavelength and bandwidth assignment/allocation (DWBA), whereby wavelength resources and time slots can be efficiently managed in a hybrid system that combines TDM and WDM systems. In the WDM PON system having an AWG-based ODN, ONU wavelengths are determined by a physical infrastructure and the WDM PON system may need to create and manage a list of all wavelengths in use.

Figure 3:
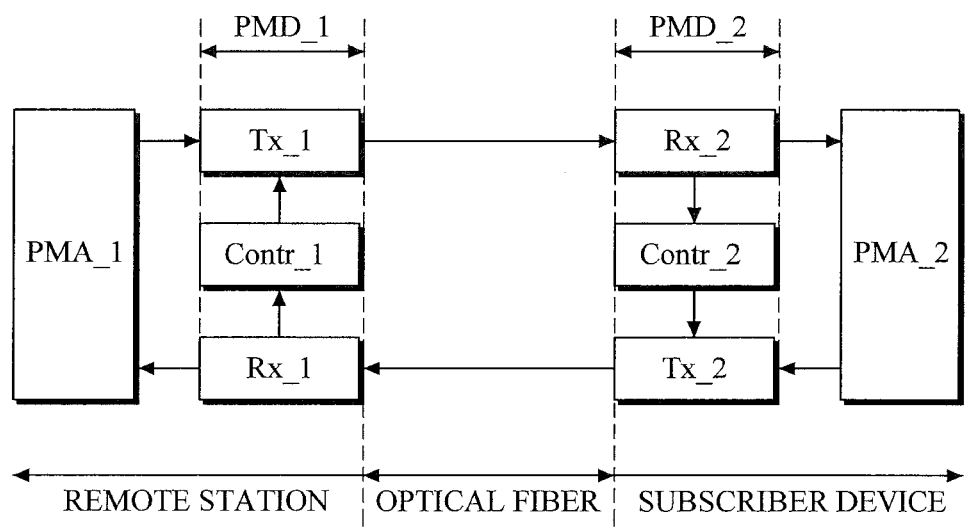
FIG. 3 is a block diagram simplifying the configuration shown in FIG. 2 which only includes Physical Medium Attachment (PMA), Physical Medium Dependent (PMD), and an optical fiber.

FIG. 3 is a block diagram simplifying the configuration shown in FIG. 2 to describe in detail technical features of the embodiment of the present invention. In FIG. 3, for simplification, only PMA, PMD and an optical fiber out of all elements shown in FIG. 2 are illustrated. In FIG. 2, in the link initialization process in section B, transmission Tx is controlled outside of the PMD, whereas in link initialization process in accordance with an exemplary embodiment of the present invention, transmission Tx is controlled inside the PMD as shown in FIG. 3. That is, when a receiving terminal Rx_1 of a central base-station or a remote station receives light or an optical signal below a reference level, a control unit Contr_1 detects the light or optical signal and blocks the light output. In contrast, when the receiving terminal Rx_1 receives light or an optical signal over the reference level, the control unit Contr_1 unblocks the light output through a transmitting terminal Tx_1, and accordingly the transmitting Tx_1 outputs light.

Hereinafter, procedures of link setup process will be described according to an exemplary embodiment of the present invention. A WDM PON link that requires link initialization between PMDs is taken as an example for explanation. In a WDM PON system or MW PON system, wavelength initialization process at an ONU corresponds to wavelength assignment process at an OLT. Thus, hereinafter, both the wavelength initialization and the wavelength assignment will be used without distinction.

As described above, according to the exemplary embodiment, the wavelength assignment is may be performed during physical installation of a new ONU. In a WDM PON system, wavelength initialization at an optical transceiver OTRx is prerequisite for initializing a link between PMD of the OLT and PMD of the ONU. Thus, the link initialization process includes wavelength initialization. Here, the wavelength initialization is a process in which a subscriber ONU searches for a wavelength for communication with the optical transceiver OTRx of a remote station OLT.

Figure 4:
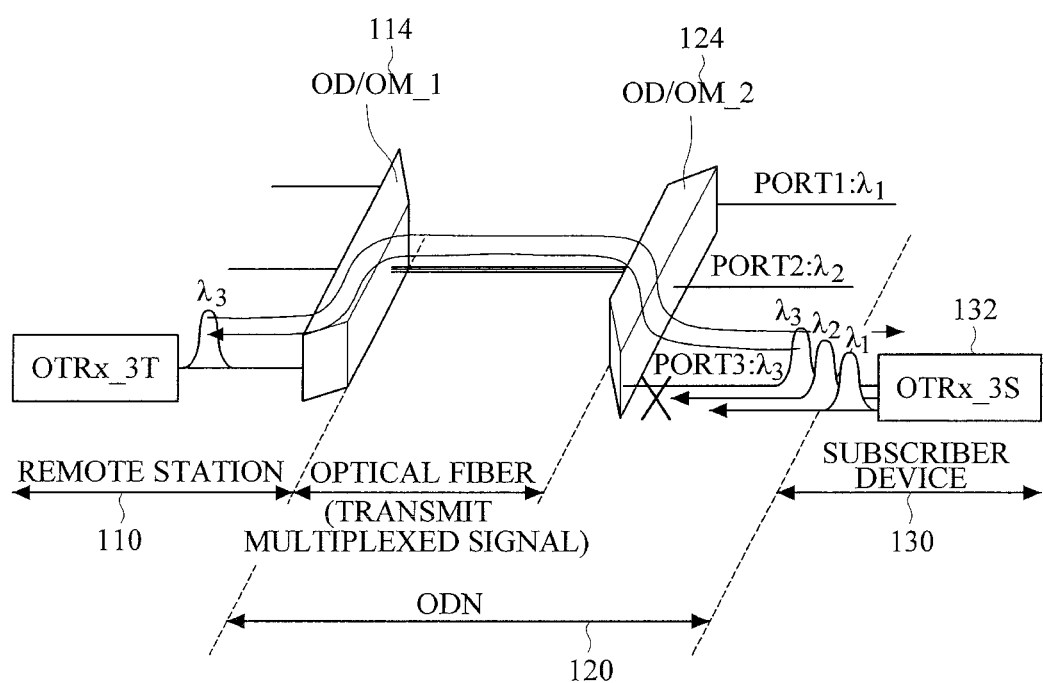
FIG. 4 is a diagram for explaining a wavelength initialization method in a WDM PON system.

FIG. 4 is a diagram for explaining a wavelength initialization method in a WDM PON system, which is an AWG-based WDM PON system, according to an exemplary embodiment of the present invention. In FIG. 4, there are shown only three operating wavelengths $\lambda_1$, $\lambda_2$, and $\lambda_3$ for the WDM PON system and the number of operating wavelengths is only for purpose of example. In practice, the WDM PON system includes one or more operating wavelengths. In addition, for simplification of illustration, an optical transceiver OTRx at a subscriber side, that is, an optical transceiver OTRx that has already been assigned wavelengths $\lambda_1$ and $\lambda_2$ is not illustrated, which is irrelevant to the present exemplary embodiment of the invention. FIG. 4 assumes that an optical transceiver requiring wavelength initialization is placed at a subscriber side, and an optical transceiver requiring no wavelength initialization is placed at a remote station side.

Referring to FIG. 4, the optical transceiver at a subscriber side 130 is OTRx_3S 132 and the optical transceiver at a remote station side 110 is OTRx_3T 112. '3S' and '3T' as affixes to indicate that, when OTRx_3S 132 at the subscriber side is set to output a wavelength of $\lambda_3$, the output wavelength of $\lambda_3$ matches a wavelength of $\lambda_3$ assigned to port 3 of an optical demultiplexer/multiplexer_2 (OD/OM_2) 124 at the optical distribution network 120 and thereby OTRx_3S 132 can establish a communication with OTRx-3T 112 of the remote station 110.

The link setup method, that is, the wavelength initialization method in accordance with the exemplary embodiment of the present invention assumes that wavelength initialization has been performed on OTRx_3T 112 at the remote station 110 and a control unit blocks the light output of a transmitter. This implies that OTRx_3T 112 at the remote station 110 does not need the wavelength initialization process, whereas OTRx_3S 132 at the subscriber side 130 requires the wavelength initialization process. In other words, wavelengths of the OLT are fixed and ONUS have their own designated wavelengths that are determined by AWG (MUX/DEMUX, filter) which is the optical demultiplexer/multiplexer_2 (OD/OM_2) 124 of the optical distribution network 120. In addition, only when the ONU wavelength matches a wavelength of the AWG (MUX/DEMUX, filter), the OLT is enabled to receive an upstream signal (upstream light output). The link initialization (wavelength initialization) by utilizing such characteristics is the basic principle of the exemplary embodiment of the present invention.

The wavelength initialization process in the WDM PON system with a configuration shown in FIG. 4 may be as follows.

1. An ONU at the subscriber side 130, that is, OTRx_3S 132 to be newly installed in the WDM PON system is connected to port 3 of the optical demultiplexer/multiplexer (OD/OM_2) 124 to which a wavelength $\lambda_3$ has been assigned.

2. A transmitting terminal Tx of OTRx_3S 132 connected to port 3 outputs $\lambda_1$-wavelength light.

3. OTRx_3S 132 that outputs the $\lambda_1$-wavelength light waits for a predetermined time ($2\tau_P + \tau_{remote\ station} + \tau_G$) (referring to FIG. 5). Here, $\tau_P$ represents propagation delay, $\tau_{remote\ station}$ represents a processing time at the remote station 110, and $\tau_G$ represents a guard time.

4. Even after the predetermined time ($2\tau_P + \tau_{remote\ station} + \tau_G$), a receiving terminal Rx of OTRx_3S 132 does not receive light from OTRx_3T 112 at the remote station side 110.

5. Continuously, the transmitting terminal Tx of OTRx_3S 132 outputs $\lambda_2$-wavelength light.

6. OTRx_3S 132 that outputs $\lambda_2$-wavelength light waits for the predetermined time ($2\tau_P + \tau_{remote\ station} + \tau_G$) again.

7. Even after the predetermined time ($2\tau_P + \tau_{remote\ station} + \tau_G$), the receiving terminal Rx of OTRx_3S 132 does not receive light from OTRx_3T 112 at the remote station side 110.

8. Then, the transmitting terminal Tx of OTRx_3S 132 outputs $\lambda_3$-wavelength light.

9. OTRx_3S 132 that outputs $\lambda_3$-wavelength light waits for the predetermined time ($2\tau_P + \tau_{remote\ station} + \tau_G$) again.

10. Before the predetermined time ($2\tau_P + \tau_{remote\ station} + \tau_G$) has elapsed, the receiving terminal Rx of OTRx_3S 132 receives light from OTRx_3T 112.

11. OTRx_3S 132 that receives the light from OTRx_3T 112 fixes an output wavelength to $\lambda_3$.

12. Accordingly, the wavelength initialization or link initialization for the newly installed ONU is completed.

Figure 5:
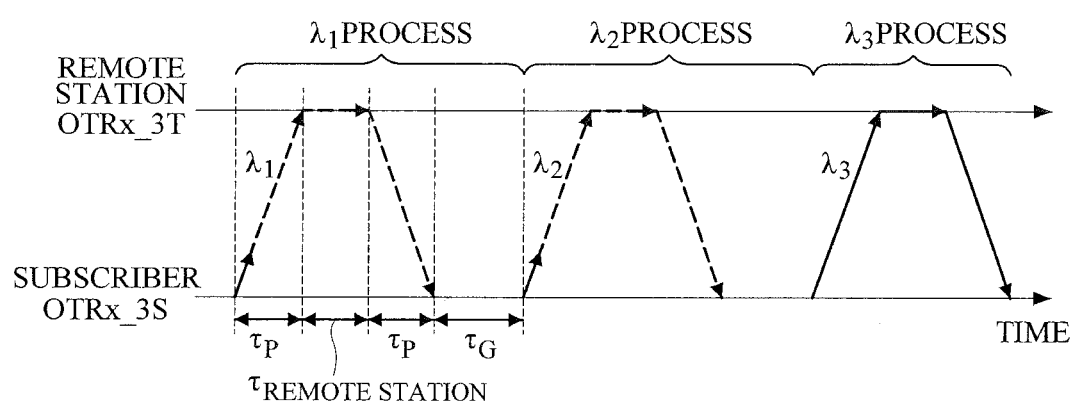
FIG. 5 is a diagram showing the progress of the wavelength initialization method of FIG. 4 along a time axis.

FIG. 5 is a diagram showing the progress of the wavelength initialization method of FIG. 4 along a time axis. In FIG. 5, thick solid arrows between a remote station and a subscriber indicate real light movement, and thick dotted-arrows indicate virtual light movement. A thick sold arrow at the remote station indicates that control process is actually performed inside OTRx_3T, and thick dotted-lines indicate virtual control process.

During $\lambda_1$ process of FIG. 5, the following procedures may be carried out:

1. The transmitting terminal Tx of OTRx_3S 132 connected to port 3 outputs $\lambda_1$-wavelength light. That is, the transmitting terminal Tx of OTRx_3S 132 transmits an optical signal of $\lambda_1$ wavelength.

2. The output optical signal of $\lambda_1$ wavelength disappears once it reaches the optical demultiplexer/multiplexer (OD/ON_2) 124 of the optical distribution network 120 (see FIG. 4) from OTRx_3S 132.

3. If the output optical signal of $\lambda_1$ wavelength continues to travel, it would take $\tau_P$ to reach OTRx_3T 112.

4. If the optical signal of $\lambda_1$ wavelength arrives at OTRx_3T 112, OTRx_3T 112 outputs $\lambda_3$-wavelength light through control process. The control process at OTRx_3T takes a time of $\tau_{remote\ station}$.

5. If OTRx_3T 112 outputs $\lambda_3$-wavelength light, it would take $\tau_P$ for this optical signal of $\lambda_3$ wavelength to arrive at OTRx_3S 132.

6. The wavelength initialization process would be completed when the optical signal of $\lambda_3$ wavelength reaches OTRx_3S 132, but the optical signal of $\lambda_3$ wavelength does not actually arrive. Thus, OTRx_3S 132 prepares for outputting an optical signal of $\lambda_2$ wavelength. It would take $\tau_G$ for the preparation.

During the $\lambda_1$ process, an operating wavelength, that is, the wavelength $\lambda_1$ of the optical signal received by OTRx_3S 132 does not match the wavelength $\lambda_3$ assigned to port 3, and thus the wavelength initialization is not completed. Thus, OTRx_3S 132 performs $\lambda_2$ process using to $\lambda_2$-wavelength light as an operating wavelength, in the same manner as the $\lambda_1$ process. During the $\lambda_2$ process, the wavelength $\lambda_2$ of the optical signal received by OTRx_3S 132 does not match the wavelength $\lambda_3$ assigned to port 3, and thus the wavelength initialization is not completed. Thereafter, OTRx_3S 132 performs $\lambda_3$ process using $\lambda_3$-wavelength light as an operating wavelength, wherein an operation wavelength ($\lambda_3$) matches the wavelength assigned to port 3, and thus the wavelength initialization process can be normally completed.

Figure 6:
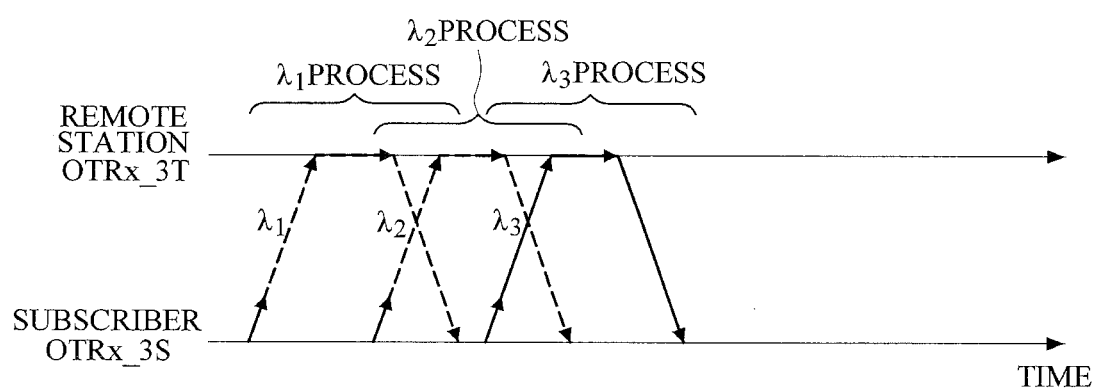
FIG. 6 is a diagram showing the progress of modified wavelength initialization method of FIG. 4 along a time axis.

FIG. 6 is a diagram showing the progress of modified wavelength initialization method of FIG. 4 along a time axis. The wavelength initialization method shown in FIG. 6 is different from the wavelength initialization method of FIG. 5 in that OTRx_3S at a subscriber side begins the subsequent process (for example, $\lambda_2$ process) before the previous process (for example, $\lambda_2$ process) is completed whereas in the wavelength initialization method of FIG. 5, the subsequent process starts after the previous process is completed. Beginning the subsequent process before the previous process is completed means that OTRx_3S starts transmitting an optical signal of a different wavelength (for example, $\lambda_2$) after a certain period of time that is shorter than the time taken for OTRx_3S to receive a response to the optical signal of $\lambda_1$ wavelength that has been previously transmitted.

In this case, the commencement of $\lambda_3$ process is not limited to prior to or after the completion of the $\lambda_1$ process. In FIG. 6, thick sold arrows between the remote station and the subscriber indicate that light moves in real, and thick dotted-arrows indicate that light moves virtually. In addition, a thick solid arrow at the remote station indicates that control process is actually performed inside OTRx_3T, and the thick dotted lines indicate virtual control process. According to the embodiment as shown in FIG. 6, it is possible to reduce the time taken for the wavelength initialization.

Figure 7:
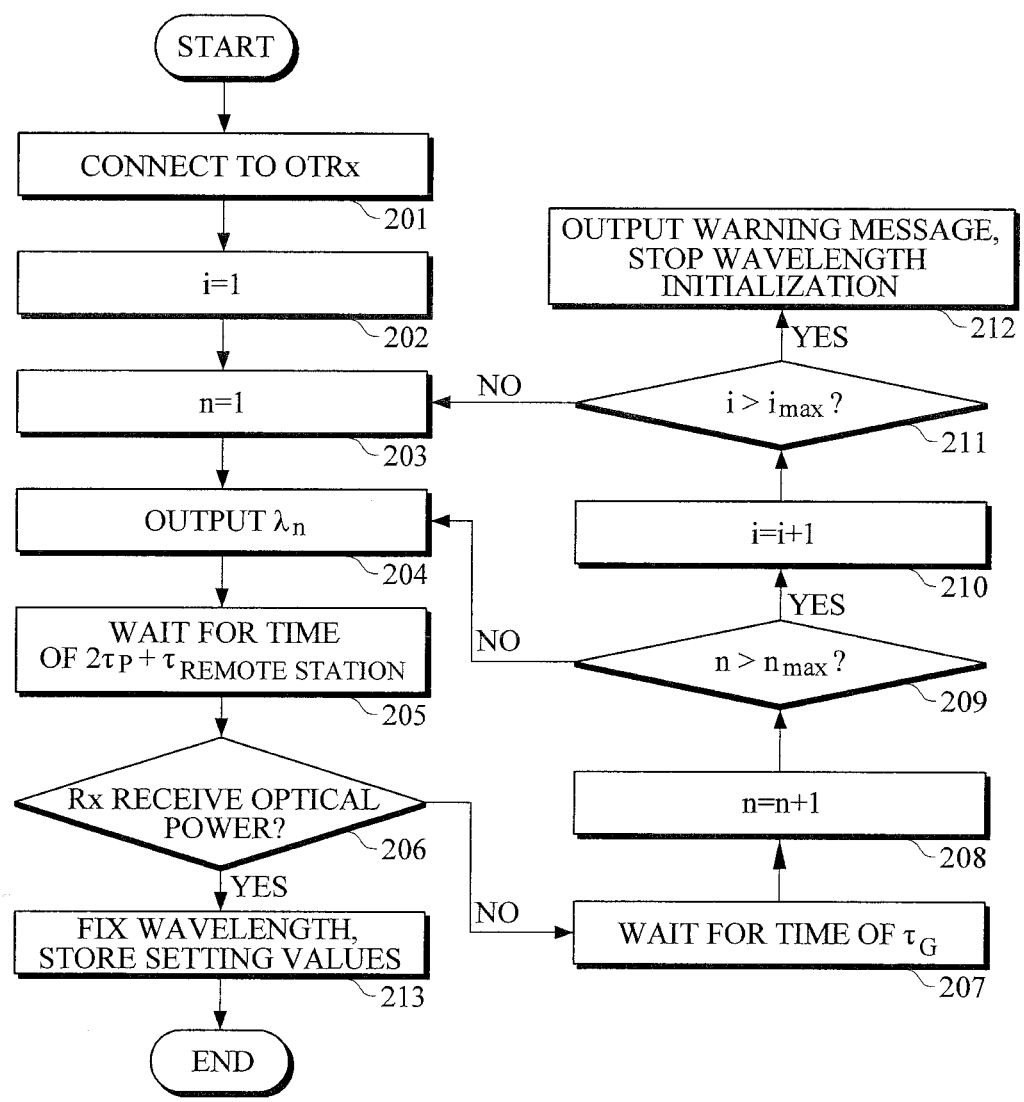
FIG. 7 is a flowchart illustrating an example of a wavelength initialization method according to an exemplary embodiment of the present invention.

FIG. 7 is a flowchart illustrating an example of a wavelength initialization method according to an exemplary embodiment of the present invention. The example shown in FIG. 7 assumes that an ONU to be newly installed in a WDM OPN system is connected to an arbitrary port of an optical demultiplexer/multiplexer or a splitter of an optical distribution network (for example, the optical demultiplexer/multiplexer (OD/OM_2) 124 of the optical distribution network (ODN) 120 in FIG. 4). In FIG. 7, n denotes a wavelength number, and $n_{MAX}$ denotes the maximum number of wavelengths in the WDM PON system. In addition, i denotes the number of repetitions of the wavelength number (n) from 1 to $n_{MAX}$, and $i_{MAX}$ denotes the allowed maximum number of repetitions.

Referring to FIG. 7, an optical transceiver OTRx is connected to an arbitrary port of an optical demultiplexer/multiplexer or a splitter in 201. This connection may indicate that a new ONU is installed in the WDM PON system. During first-wavelength initialization process (set i as 1 in 202), an optical signal of a first wavelength $\lambda_n$ (set n as 1 in 203) is output in 204. In 204, the flow waits for a predetermined time in 205. The predetermined time may be $2\tau_P + \tau_{remote\ station}$ (see FIG. 5) or shorter (see FIG. 6).

Then, it is determined whether a receiving terminal Rx of the optical transceiver OTRx receives an optical signal before the predetermined time has elapsed in 206. In 206, the determination of whether the receiving terminal Rx receives the optical signal may be made based on received signal strength indication (RSSI), loss of power (LOP), loss of signal (LOS), loss of lock (LOL), and the like, and any other means may be used to determine whether light or an optical signal has arrived at the receiving terminal Rx of PMD. In the case where the receiving terminal Rx fails to receive the optical signal, the flow waits for another predetermined time $\tau_{remote\ station}$ in 207. In one example, the waiting time in 207 may vary as described above (referring to FIGS. 5 and 6).

When n=n+1 is set in 208 and it is determined in 209 that n is equal to or smaller than $n_{MAX}$, light of a second wavelength $\lambda_n$ is output, and then operations 205 and 206 are repeated. In 206, if it is determined that the receiving terminal Rx fails to receive the optical signal, the flow further waits for the predetermined time $\tau_{remote\ station}$, and then the operations 204 to 206 are performed again with the subsequent wavelength. These operations may be repeated until n which is a result from operation 208 becomes greater than $n_{MAX}$ in 209. If it is determined that n is greater than $n_{MAX}$ in 209, the number i of repetitions is increased by 1 (i=i+1) in 210, and it is determined whether the setting result of operation 210, that is, the number i of repetitions is greater than $i_{MAX}$ in 211. If it is determined that the number i of repetitions is greater than $i_{MAX}$ in 211, a warning message is issued and the wavelength initialization is stopped in 212. On the contrary, if the number i of repetitions is equal to or smaller than $i_{MAX}$, operations from 203 are repeated.

If it is determined that the receiving terminal Rx receives the optical signal in 206, the wavelength initialization process is completed by fixing the corresponding wavelength and storing the setting values in 213.

Figure 8:
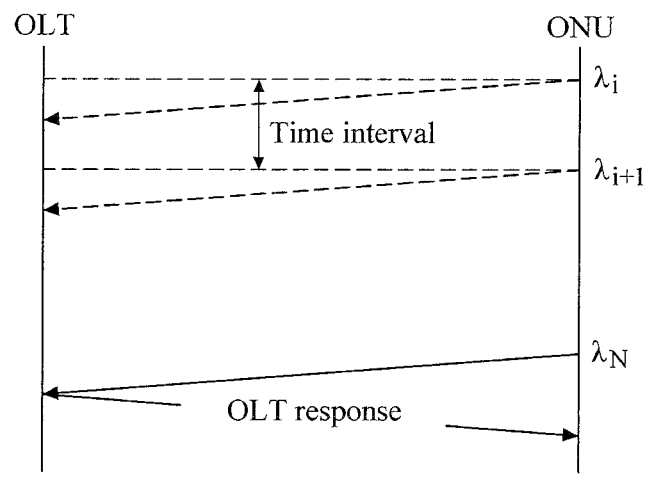
FIG. 8 is a signaling chart showing an example of a wavelength initialization method according to the exemplary embodiment of the present invention.

FIG. 8 is a signaling chart showing an example of a wavelength initialization method according to the exemplary embodiment of the present invention. In FIG. 8, an OLT is place at a remote station (referring to FIG. 4) and an ONU is newly installed in a WDN PON system and placed at a subscriber side. Procedures of the wavelength assignment process shown in FIG. 8 are as follows:

1. The ONU changes a wavelength of an optical signal from $\lambda_i$ to $\lambda_N$ at time intervals. The time interval may be varied as described above. For example, the time interval may be $2\tau_P + \tau_{remote\ station} + \tau_G$ or shorter.

2. The OLT detects a change in upstream status during the ONU is changing the wavelength. Here, a "change in upstream status" means the change occurring in an optical transceiver (OTRx) of the OLT. This change may be caused by a change in the state of the ONU, and the OLT may detect the change. For example, the change in the state of the ONU may be a wavelength variation, and the change in the state of the OLT may be a variation in optical power received by a receiving terminal Rx of the OTRx. When the wavelength of the optical signal output from the ONU matches a wavelength bandwidth of AWG connected with the ONU, a loss of the optical signal is minimized and thus the optical power input to an optical transceiver OTRx of the OLT is a maximum. In this case, the AWG has a loss curve with respect to each wavelength. That is, the AWG having a transmission bandwidth in a Gaussian-curve shape has a loss curve also in a Gaussian-curve shape with respect to each wavelength. Thus, in a case in which a wavelength of an optical signal output from the ONU belongs to a wavelength bandwidth of the AWG connected to the ONU, if the wavelength of the optical signal matches a center wavelength of the AWG, a loss is caused due to the wavelength difference, and such loss is varied according to wavelength. As a result, optical power input to an OLT optical receiving unit has reduced intensity due to the loss. Such a change in the upstream state may be represented as "presence" and "absence" and/or the combination thereof, and the OLT determines whether to transmit an OLT response based on the change in the state.

3. Upon detecting the change in the upstream state, the OLT transmits an OLT response to the ONU. The OLT response may include "presence" and "absence" of optical power at an optical transceiver of the OLT, and/or the combination thereof. Alternatively, the OLT response may include "presence" and "absence" of a monitoring signal of the optical transceiver of the OLT, and/or the combination thereof. The OLT response may use a modulation signal.

4. Upon receiving the OLT response, the ONU completes the wavelength initialization process, and as a result, a unique wavelength is assigned to the ONU.

Figure 9:
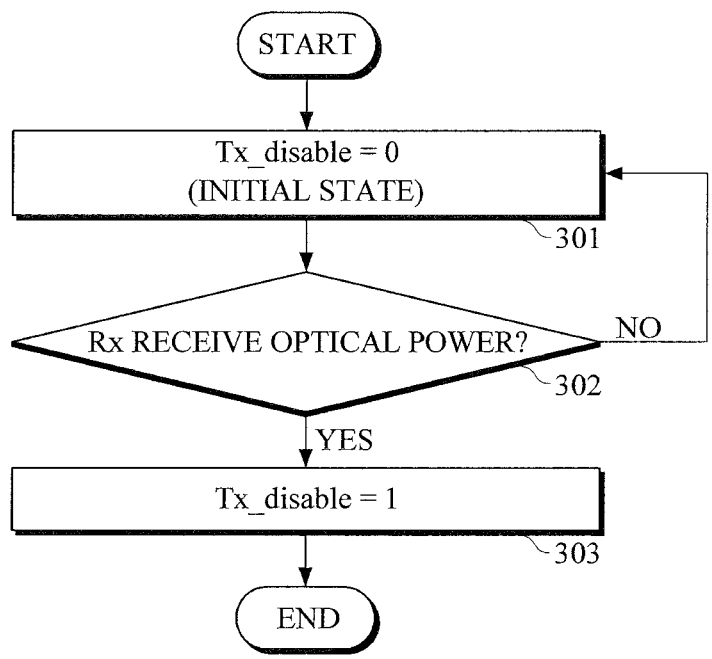
FIG. 9 is a flowchart illustrating an example of a work flow of the optical transceiver (OTRx) of the OLT shown in FIG. 8.

FIG. 9 is a flowchart illustrating an example of a work flow of the optical transceiver (OTRx) of the OLT shown in FIG. 8. In FIG. 9, Tx_disable is a variable that controls the light output of the transmitting terminal Tx of the OTRx. When Tx_disable is "0", the transmitting terminal Tx blocks the light output and when it is "1", the transmitting terminal Tx unblocks the is light output. The value of the variable is only for purpose of example, and may vary.

Referring to FIG. 9, the OTRx of the OLT stays in standby state while blocking light output in 301. That is, the transmitting terminal Tx of the OTRx of the OLT is initially in a state that blocks the light output. Then, it is determined whether the receiving terminal Rx of the OTRx of the OLT receives optical power in 302. If a determination is made that the receiving terminal Rx of the OTRx of the OLT cannot receive the optical power, the transmitting terminal Tx of the OTRx of the OLT maintains the light-output-blocked state in 301, and continues to monitor whether the receiving terminal Rx receives the optical power in 302. On the contrary, if the determination is made that the receiving terminal Rx receives the optical power in 302, the transmitting terminal Tx of the OTRx of the OLT unblocks the light output in 303. Accordingly, the transmitting terminal Tx is allowed to transmit an OLT response (referring to FIG. 8) to the ONU.

In the example, the Tx_disable variable may be implemented in various methods, such as using a Tx_disable port to block signal output from a laser diode driver (LDD) to the transmitting terminal Tx and a port to input power to the LDD, which can block or reduce the light output of the transmitting terminal Tx. In addition, the determination whether the optical power is received by the receiving terminal Rx may be made based on various means, such as RSSI, LOP, LOS, and LOL, which can be used for determining whether light or an optical signal arrives at the receiving terminal Rx of PMD.

As described above, the wavelength assignment process may be applied to an MW PON system including a splitter. The example of the MW PON including a splitter is shown in FIGS. 1A and 1B. By using the splitter in the MW PON system illustrated in FIGS. 1A and 1B, all wavelengths of the signal multiplexed by the OLT are input to the subscriber device, that is, the respective ONUs, with a reduced optical power. Hence, a filter is required to select the wavelength designated to the corresponding ONU. In this case, to maintain colorless properties, the filter may be a tunable wavelength filter.

The OLT is a communication system placed at a remote station, and includes an optical transceiver. Technically, these terms should be distinguished from each other, but in the following description, these terms are used interchangeably. In addition, the ONU is a communication system placed at a subscriber side, and ONT is available. Both ONU and ONT are systems, each including an optical transceiver. Precisely, the terms "OLT", "ONU", "ONT", "optical transceiver", and "light source" should be distinguished, but in the following description, these terms are used interchangeably for convenience of description, and may be discerned from the context by those skilled in the art.

In the example, the positions of the OLT and ONU may be switched. That is, the subscriber side and the remote station side can be changed. In other words, the exemplary embodiments of the present invention relate to two optical transceivers, and the positions of these optical transceivers are not important. However, either of the optical transceivers should know its wavelength (in other words, an oscillation wavelength of the optical transceiver should be fixed on a corresponding channel), and the following example assumes that the OLT is such optical transceiver. In this example, the ONU may identify a wavelength of light to be output therefrom in two situations as below.

1. All OLTs are power-off (there is no light output)
2. At least one OLT is power-on (there is light output)

Figure 10A:
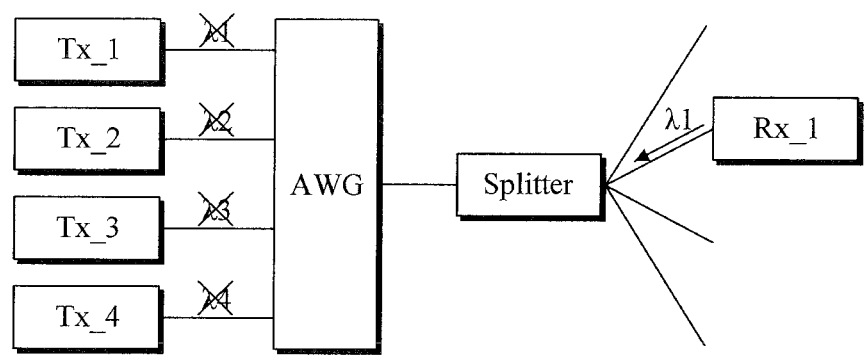
FIG. 10A is a diagram for explaining wavelength initialization process in an MW PON system including a splitter when all OLT are power-off.
Figure 10B:
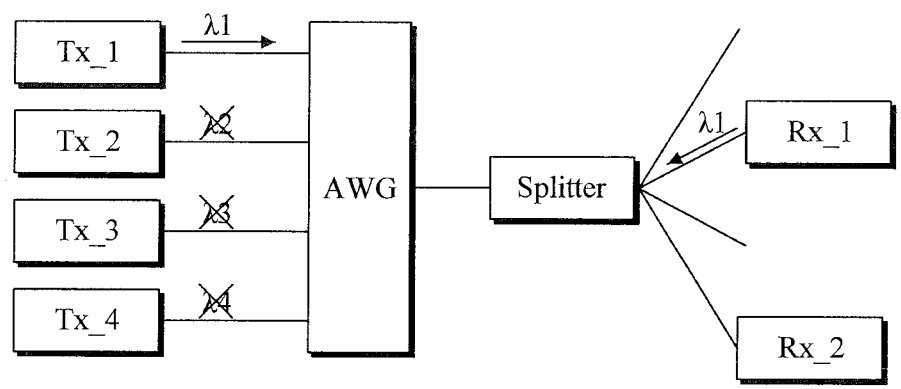

FIG. 10A is a diagram for explaining wavelength initialization process in an MW PON system including a splitter when all OLTs are power-off, and FIG. 10B is a diagram for explaining wavelength initialization process in the MW PON system including the splitter when at least one OLT is power-on. For convenience of illustration, only a transmitting terminal Tx of the OLT and a receiving terminal Rx of the ONU are illustrated from the point of view of the subject of the wavelength initialization (or wavelength change or wavelength assignment) process, and a filter is not illustrated.

Referring to FIG. 10A, since all light sources are power off, no optical power is input to the receiving terminal Rx of the ONU, and only outputs light of a first wavelength $\lambda_1$. On the contrary, referring to FIG. 10B, since at least one light source is power-on, optical power is input to the receiving terminal Rx of the ONU. In this case, a wavelength of a filter is tuned from the first wavelength to the last wavelength according to a predetermined order. If the wavelength of the filter is tuned to a wavelength corresponding to a channel of a power-off OLT light source, there is no optical power input to the receiving terminal Rx of the ONU and the ONU outputs light of the wavelength corresponding to the channel and then, if receiving response optical power from the OLT, stops the wavelength change.

Figure 11A:
FIG. 11A is a block diagram illustrating an example of the disposition of a filter in an ONU in an MW PON system including a splitter.
Figure 11B:
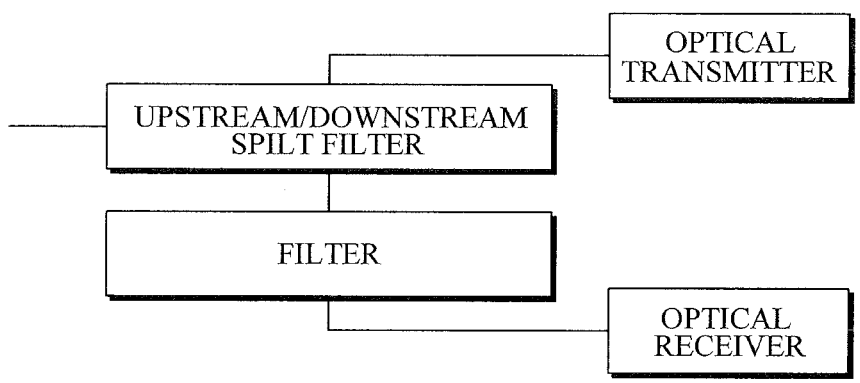
FIG. 11B is a block diagram illustrating another example of the disposition of a filter in an ONU in an MW PON system.

FIG. 11A is a block diagram illustrating an example of the disposition of a filter in an ONU in an MW PON system including a splitter. Referring to FIG. 11A, the filter is placed on a common path of an optical receiver (at a receiving terminal Rx) and an optical transmitter (at a transmitting terminal Tx) of the ONU. FIG. 11B is a block diagram illustrating another example of the disposition of a filter in an ONU in an MW PON system. Referring to FIG. 11B, the filter is disposed in front of the optical receiver on a path branched from a common path of the optical transmitter and the optical receiver, and this disposition is suitable to a case in which upstream and downstream wavelengths are the same or a case in which the filter has Free-Spectral-Range (FSR) properties. For example, if the optical transmitter of the ONU includes an isolator or a filter for oscillation wavelength control and can thereby block optical power for receiving light, the filter may be located on a path of the optical receiver.

Figure 12:
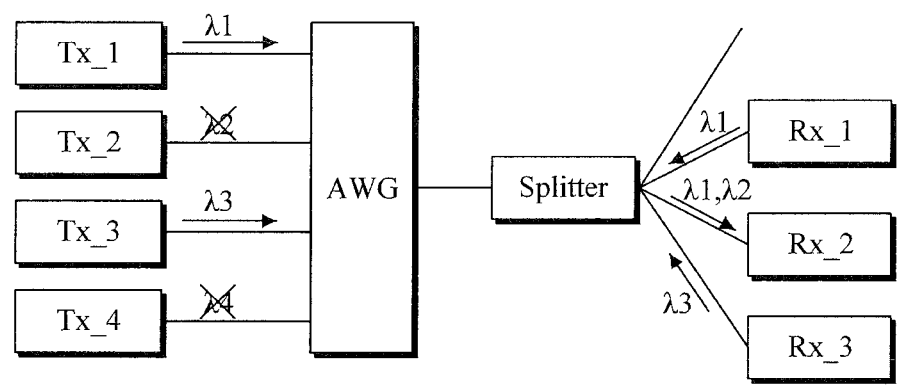
FIG. 12 is a diagram for explaining wavelength initialization process in an MW PON system including a splitter.

The ONU in the MW PON system including the splitter uses each wavelength in a sequence of wavelengths of different channels, and, even when there is an empty channel, a new ONU, which is connected later, outputs a wavelength of the empty channel. Accordingly, the wavelengths can be easily managed. FIG. 12 is a diagram for explaining wavelength initialization process in an MW PON system including a splitter, in which a receiving terminal Rx_2 is connected to the splitter while wavelengths $\lambda_1$ and $\lambda_3$ are in use. Referring to FIG. 12, if a filter of the receiving terminal Rx_2 is tuned to a wavelength corresponding to $\lambda_1$, optical power is input to the receiving terminal Rx_2 and thus the wavelength is skipped. If the filter of the receiving terminal Rx_2 is tuned to a wavelength corresponding to $\lambda_2$, optical power is input to the receiving terminal Rx_2, and thus a wavelength of an optical receiver is fixed.

In the WDM PON system, the wavelength assignment process in accordance with the above exemplary embodiments may be applied to the wavelength tuning process intact or in an adaptively modified form. The wavelength tuning process includes tuning of a wavelength assigned to an ONU in the WDM PON system. That is, even in a case in which a unique wavelength is assigned to the ONU through the aforementioned wavelength assignment process, the ONU may change the assigned wavelength to another or its wavelength to the assigned wavelength while the ONU is operating. To this end, in the MW PON system, each ONU may include a wavelength-tunable optical transceiver OTRx. For example, if an amount of traffic over some wavelengths is small or the wavelengths are in idle state and the other wavelengths have excessive load exerted thereon, load balancing may be performed, whereby all or some of the ONUs assigned the wavelengths having load exerted thereon are tuned to the wavelengths in idle state. Accordingly, traffic balancing is enabled within available wavelengths, and PON operation is maintained to be stable. As another example, if most wavelengths are in use for the MW PON system, but only a small amount of traffic is carried over each of the used wavelengths, the number of wavelengths in use may be reduced to efficiently operate the MW PON system. In this example, an arbitrary port of the OLT is deactivated and the ONU is tuned to a subset of the available wavelengths, and thus the power saving effect of the OLT may be obtained. To this end, the MW PON system may include a wavelength-tunable laser as a light source. One of the most important performance parameters of the wavelength-tunable laser for use in the MW PON system in which wavelength variation frequently takes place due to dynamic wavelength assignment and the like is a wavelength tunable time. For example, the MW PON system may be graded based on a wavelength tuning speed or tuning time. However, the wavelength tuning speed or tuning time may vary according to measurement method, and hence a standardized method for measuring the tuning time and a device implementing the method are required.

Figure 13:
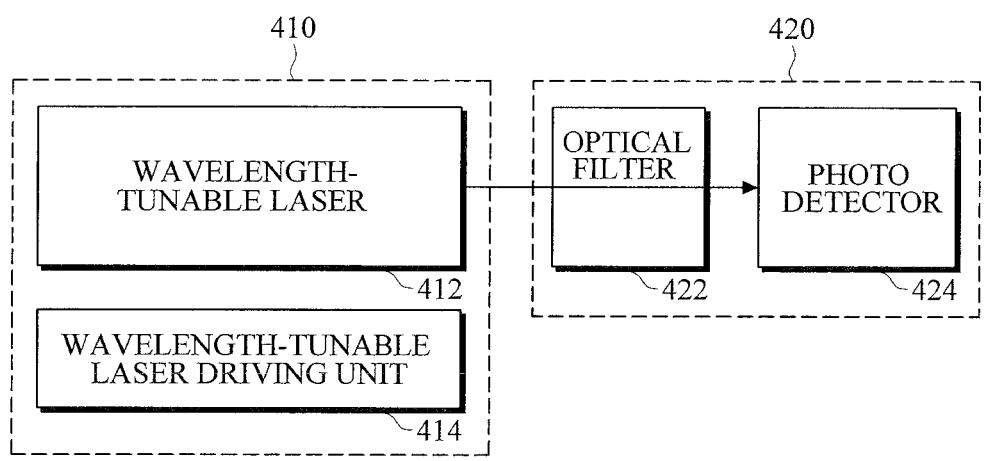
FIG. 13 is a block diagram illustrating a configuration of a tuning time measurement device according to an exemplary embodiment of the present invention.
Figure 14:
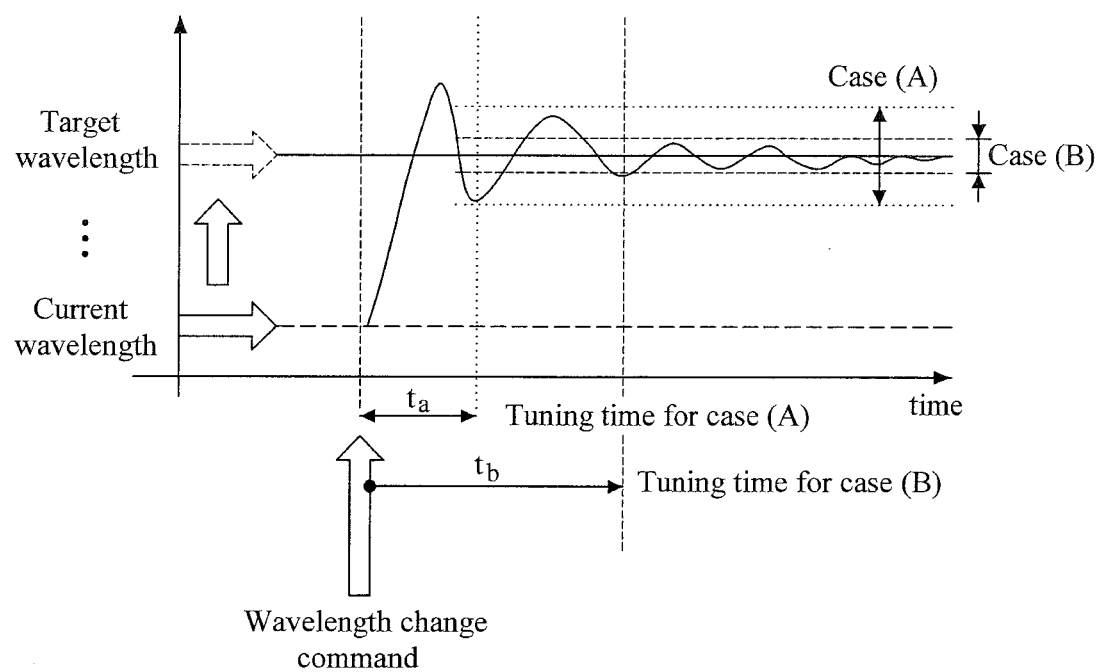
FIG. 14 is a graph for explaining a method of the tuning time measurement device of FIG. 13 measuring a tuning time in the case of a different bandwidth.
Figure 15:
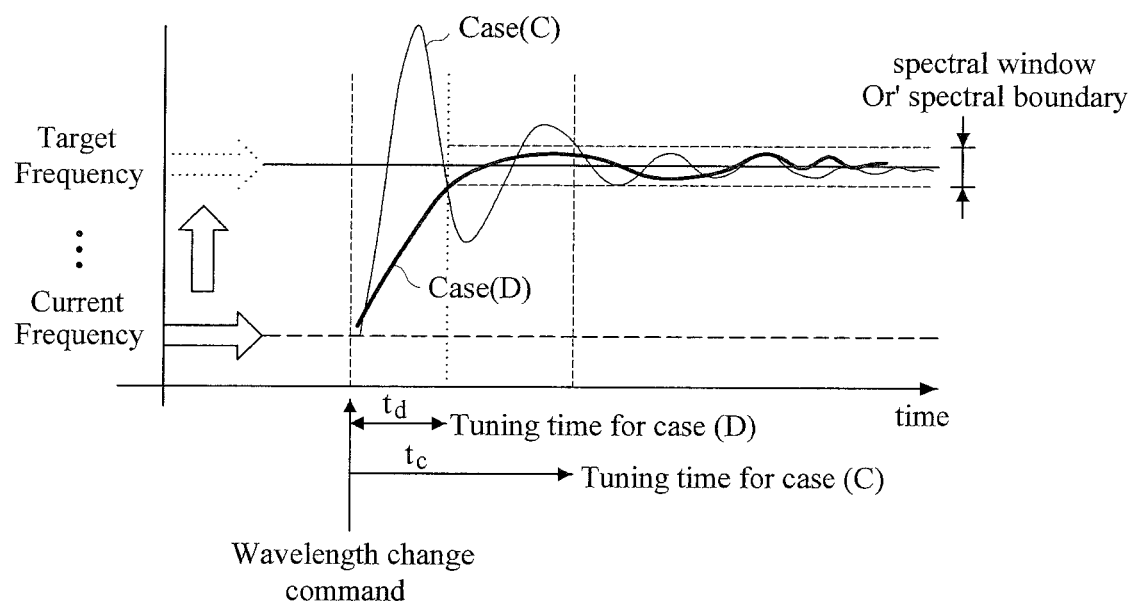
FIG. 15 is a graph for explaining a method of the tuning time measurement device of FIG. 13 measuring a tuning time in the case of a different waveform of light.

FIG. 13 is a block diagram illustrating a configuration of a device (hereinafter, referred to as a "tuning time measurement device") for measuring a tuning time of a wavelength-tunable light source according to an exemplary embodiment of the present invention. FIGS. 14 and 15 are graphs for explaining a method of measuring the tuning time in the tuning time measurement device shown in FIG. 13. Referring to FIG. 13, a wavelength-tunable light source 410 includes a wavelength-tunable laser 142 and a wavelength-tunable laser driving unit 414. The tuning time measurement device 410 includes an optical filter 422 and a photo detector 424. The tuning time indicates a time that is taken for wavelengths of light to be stabilized within a predetermined range of bandwidth after a wavelength change command is issued.

The optical filter 422 allows only a predetermined bandwidth of light to pass through. The optical filter 422 has spectral window or spectral bandwidth as shown in FIG. 15. The photo detector 424 detects the light passing through the optical filter 412. Hence, the tuning time measured by the tuning time measurement device 420 with the above configuration may be varied according to a bandwidth of the optical filter 421 even when the light is output from the same wavelength-tunable light source 410. Hereinafter, the tuning time measurement will be described in detail with reference to FIGS. 14 and 15.

FIGS. 14 and 15 are graphs plotting a wavelength of light from the wavelength-tunable light source 410 over time when a current wavelength is tuned to a target wavelength. More specifically, the graph of FIG. 14 shows the wavelength tuning by changing a bandwidth of the optical filter 422 and the graph of FIG. 15 shows the wavelength tuning in the case of different waveforms of light (that is, waveform properties of the light source are different). Referring to FIG. 14, it is noted that case A is different from case B in a bandwidth of the optical filter 422, whereby the tuning time $t_a$ for case A becomes different from a tuning time $t_b$ for case B. Thus, if a bandwidth of the optical filter 422 is set to be narrower, the tuning time may be increased. Referring to FIG. 15, it is noted that case C and Case D have different time for light to be stabilized, whereby a tuning time $t_c$ for case C becomes longer than a tuning time $t_d$ for case D.

As described above, according to the exemplary embodiments of the present invention, it is possible to perform the wavelength initialization process on physical layers of an OLT and of an ONU in a WDM PON system. Thus, the wavelength initialization process can be seamlessly performed, regardless of a network configuration of the WDM PON system, and provide compatibility with conventional products. In addition, the exemplary embodiments of the present invention may be implemented in an MW PON system which uses the combination of TDM and WDM.

Moreover, the exemplary embodiments of the present invention are easy to apply to products through a simple technical implementation, while accomplishing price competitiveness by utilizing existing elements of conventional products, and secure more space within an optical transceiver OTRx, as compared with the conventional technology. Further, the embodiments of the present invention can provide compatibility with products by other manufacturers and flexible network application of the optical transceiver OTRx, reduce energy consumption by the optical transceiver OTRx at a remote station, and maintain the intensity of light input to an optical fiber at a low level, and thus the optical fiber management stability can be increased.

The methods and/or operations described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A link setup method for a Wavelength Division Multiplexing Passive Optical Network (WDM PON) system including a service providing device, a local node, and a plurality of subscriber devices, the link setup method comprising:

assigning an initial wavelength for communication between the service providing device and a new subscriber device, wherein the new subscriber device communicates to the service providing device via an upstream optical signal having a predetermined upstream wavelength through the local node, wherein the service providing device assigns the initial wavelength to and establishes a communication link to the new subscriber device by transmitting a downstream optical signal having a predetermined downstream wavelength to the new subscriber device, wherein the upstream optical signal and the downstream optical signal do not include a control message.

2. The link setup method of claim 1, wherein the assigning of the initial wavelength is performed through signal transmission/reception between a physical layer of the service providing device and a physical layer of the new subscriber device.

3. The link setup method of claim 2, wherein the local node includes one or more optical multiplexers/demultiplexers and the assigning of the initial wavelength is performed when the new subscriber device is physically installed and a communication link between the new subscriber device and the service providing device is not established.

4. The link setup method of claim 3, wherein the assigning of the initial wavelength comprises transmitting, at the new subscriber device, an optical signal of a predetermined wavelength to the service providing device, and receiving, at the new subscriber device, a response to the optical signal from the service providing device.

5. The link setup method of claim 4, wherein the new subscriber device changes a wavelength of the optical signal at predetermined time intervals and transmits the optical signal until receiving the response and the assigning of the initial wavelength is completed when the new subscriber device receives the response.

6. The link setup method of claim 5, wherein the time interval is $2\tau_P + \tau_{remote\ station} + \tau_G$, in which $2\tau_P$ indicates a propagation delay time of the transmitted optical signal $\tau_{remote\ station}$ denotes a processing time at the service providing device and $\tau_G$ indicates a guard time.

7. The link setup method of claim 5, wherein the predetermined time interval is shorter than a time taken for the subscriber device to receive a response to an optical signal that the subscriber device previously transmitted, until receiving the response from the service providing device and the assigning of the initial wavelength is completed.

8. The link setup method of claim 2, wherein the local node includes one or more splitters.

9. The link setup method of claim 8, wherein the new subscriber device includes a wavelength-tunable filter in front of an optical transceiver of the new subscriber device.

10. The link setup method of claim 9, wherein the wavelength-tunable filter is disposed on a common path of a transmitting terminal and a receiving terminal of the optical transceiver.

11. The link setup method of claim 9, wherein the optical transceiver uses light having upstream and downstream wavelengths being the same as each other or the filter has free-spectral-range (FSR) properties, and the optical transceiver is disposed on a path of a receiving terminal of the WDM PON system.

12. The link setup method of claim 2, further comprising:
checking, at a media access control (MAC) layer, whether a wavelength has been assigned to the new subscriber device.

13. The link setup method of claim 1, wherein the WDM PON system includes one or more service providing devices including the service providing device and the one or more service providing devices provide services to the plurality of subscriber devices using a combination of a time division multiplexing scheme and a wavelength division multiplexing scheme.

* * * * *